United States Patent [19]

Murphy

[11] Patent Number: 4,806,264

[45] Date of Patent: Feb. 21, 1989

[54] METHOD OF SELECTIVELY REMOVING SELENIUM IONS FROM AN AQUEOUS SOLUTION

[75] Inventor: Andrew P. Murphy, Littleton, Colo.

[73] Assignee: The United Sates of America as represented by the Secretary of the Interior, Washington, D.C.

[21] Appl. No.: 91,812

[22] Filed: Sep. 1, 1987

[51] Int. Cl.$^4$ .............................. C02F 1/48; C02F 1/70
[52] U.S. Cl. .................................. 210/695; 210/717; 210/719; 210/902
[58] Field of Search .................. 75/121; 210/695, 719, 210/902, 717; 423/508-510

[56] References Cited

U.S. PATENT DOCUMENTS

| | | | |
|---|---|---|---|
| 3,084,994 | 4/1963 | Yomiyama et al. | 423/509 |
| 3,933,635 | 1/1976 | Marchant | 210/719 |
| 4,026,797 | 5/1977 | Nikolic et al. | 210/719 |
| 4,405,464 | 9/1983 | Baldwin et al. | 210/719 |

*Primary Examiner*—Ivars Cintins
*Attorney, Agent, or Firm*—E. Philip Koltos

[57] ABSTRACT

A method of selectively removing selenium ions from an aequeous solution containing selenium ions comprises contacting the solution with an amount of ferrous ion effective to reduce the selenium ions to elemental selenium. The contacting is preferably conducted at a pH of about 9 and the ferrous ions are preferably provided in situ in the form of ferrous hydroxide. The method may further comprise removing ferric oxides to which the ferrous ions are oxidized, these ferric oxides containing the elemental selenium produced by the reduction of the selenium ions, and separating the ferric oxides from the elemental selenium by adding a strong acid thereto.

14 Claims, No Drawings

METHOD OF SELECTIVELY REMOVING SELENIUM IONS FROM AN AQUEOUS SOLUTION

BACKGROUND OF THE INVENTION

1. Field of the Invention

This invention relates to a method for selectively removing selenium ions from an aqueous solution by reducing the ions to elemental selenium. More specifically, the present method utilizes the reducing power of ferrous hydroxide to convert selenium ions to elemental selenium while the ferrous hydroxide is oxidized to ferric hydroxides.

2. Description of the Background

High levels of selenium ions in potable water are detrimental for human health. In geographical areas where selenium ion concentrations are considered a problem, these ions need to be removed from the water sources. A preferred method for attaining this objective is to reduce the ions to elemental selenium. This form of selenium is not soluble in water and may therefore be easily removed.

Up to the present time only limited success has been obtained in removing selenium ions from water systems. Basicaly, known methods may be divided into four categories:

(1) Conventional desalting techniques such as reverse osmosis, ion-exchange and electrodialysis (Maneval, J. E., Kline, G. and Sinkovik, J., "Selenium Removal from Drinking Water by Ion Exchange" EPA-81-02-5401, Municipal Environmental Research Laboratory, Office of Research and Development, Cincinnati, Ohio (1983), Sorg, T. J., Logsdon, G. S., "Treatment Technology to Meet the Interim Primary Drinking Water Regulations for Inorganics: Part 2", J. Amer. Water Works Assoc. (1978)), (2) Biological Processes (U.S. Pat. No. 4,519,912 to Kauffman et al, Gersberg, R., Brenner, R., and Elkins, B. V., "Removal of Selenium Using Bacteria," California Technology Institute Publication No. CATI/860201 (1986), Doran, J. W., and Alexander, M., "Microbial Transformations of Selenium", Applied and Environmental Microbiology (1977)), (3) Adsorption techniques such as those using activated alumina or the like (Hingston, F. J., Atkinson, R. J., Possner, A. M. and Quirk, J. P., "Specific Adsorption of Anions", Nature 215:1459–1461 (1967), Hingston, F. J., Possner, A. M., and Quirk, J. P., "Adsorption of Selenite by Geothite", Adv. in Chem. Series 70:82–90 (1986), Ames, L. L., Salter, P. F., McGarrah, J. E. and Walker, B. A., "Selenate-Selenium Sorption on a Columbia River Basalt", Chem. Geol. 43:287 (1979), and (4) Chemical reduction processes (U.S. Pat. No. 4,405,464 to Baldwin et al (1983), U.S. Pat. No. 3,933,636 to Marchant (1976) and U.S. Pat. No. 3,387,928 to Doumas (1968)).

In general, the greatest disadvantage of the prior art processes known as conventional desalting techniques is the lack of specificity of the processes for selenate-selenium ions with respect to sulfate ions (see Maneval et al, supra). These processes entail a high cost once all the factors are taken into account. In addition, at the end of conventional desalting processes a brine stream rich in toxic selenate ions must be discarded. Although specific for selenate ions, biological processes for the removal of these ions require days rather than minutes for the reduction of selenium ions, achieve only partial reduction and may generate more toxic compounds such as selenomethionine. Indeed, studies reported on LD 50's (dose causing 50% deaths) for striped bass, the amount of selenomethionine is 10,000 more toxic than selenateselenium ions that are being removed. The adsorption processes seem to involve the formation of insoluble complexes such as the ferric-selenite complex (Chau, Y. K. and Riley, J. P., Chin, ACTA 33:36–49 (1965), Decarla, E. H., Zeitlin, H., and Fernado, Q., Anal. Chem. 53:1104–1107 (1981)). Selenite ions form the insoluble complexes but selenate ions do not form such complexes. Adsorption processes do not show any specificity for selenate ions over sulfate ions. Chemical reduction techniques are known which utilize iron and zinc. However, Baldwin et al, supra, clearly specify metallic iron as necessary for the reductant and operate their process under acidic pH conditions instead of the alkaline conditions needed with ferrous hydroxide. Baldwin et al reduces the concentration of selenium ions in the Se VI oxidation state in an aqueous solution. The aqueous solution is admixed with a quantity of metallic iron which reduces the seenium ions to a lower oxidation state. The dissolved metallic iron is then hydrolized to form an iron hydroxide which precipitates and can thus be separated from the solution. On the other hand, zinc is known to be toxic to fish.

Other methods for removing selenium ions from a solution are also known. U.S. Pat. No. 3,084,994 discloses a method for recovering selenium ions from a selenium quartz compound-enriched solution. An aqueous solution containing selenium ions and having a pH of 7–9 is oxidized in the presence of air or oxygen over a copper oxide, iron oxide or nickel oxide catalyst. U.S. Pat. No. 3,959,097 to Queneau discloses a method for removing trace amounts of selenium from a metal sulfide concentrate using a selenium collector such as a source of ferrous ions and air to generate ferric hydroxide. U.S. Pat. No. 4,026,797 to Nikolic relates to a method for removing selenium from copper electrolytes by adding nickel powder, cobalt powder or iron powder. Sodium sulfide can also be used along with a subsequent addition of ferric sulfide.

However, the above methods for removing selenium from aqueous solutions have limited applications.

Therefore, a need still exists for an improved method for removing selenium ions from an aqueous solution containing such ions.

SUMMARY OF THE INVENTION

This invention relates to a method of selectively removing selenium ions from an aqueous solution containing the selenium ions, comprising contacting the solution with an amount of ferrous hydroxide solids to reduce the selenium ions to elemental selenium.

The ferrous hydroxide solids are oxidized to form precipitated magnetic ferric oxides. The elemental selenium particles are contained in the precipitated oxides.

The method of the invention may further comprise magnetically removing the ferric oxides containing the elemental selenium.

DETAILED DESCRIPTION

A previous unknown chemical reaction in which selenium ions are reduced to elemental selenium has proven to be the basis of a novel chemical method for selectively removing selenium ions from water systems.

This method is useful for the selective removal of selenium ions from useful water sources.

Briefly, the reaction between the selenium ions and ferrous hydroxide occurs under alkaline conditions to produce magnetic iron oxides and sodium hydroxide. This reaction occurs because of the characteristic of ferrous hydroxide to reduce the selenate and selenite ions. Taking advantage of the reduction potential, the ferrous hydroxide reduces the selenium ions to elemental selenium and is itself oxidized to ferric oxides which are highly magnetic (magnetite and maghemite). The elemental selenium particles remain within the particles of the iron oxides.

The reaction stoichiometry in the presence of excess ferrous hydroxide to produce magnetite is as follows:

$$Na_2SeO_4 + 9\ Fe(OH)_2 \rightarrow Se^O + 3\ Fe_3O_4 + 2\ NaOH + 8\ H_2O.$$

The reaction stoichiometry for excess ferrous hydroxide producing maghemite is as follows:

$$Na_2SeO_4 + 6\ Fe(OH)_2 \rightarrow Se^O + 3\ Fe_2O_3 + 2\ NaOH + 5\ H_2O.$$

The reaction rates reach a maximum criticality at a pH of about 9, and then drop sharply at pH's greater than 10 or less than 8. In one aspect of the invention, at a pH of about 9, in the presence of an increased selenate ion to ferrous hydroxide ratio, more maghemite rather than magnetite forms. Also, at a pH of about 9, with increased selenate ion and ferrous hydroxide, magnetite is produced as well as elemental selenium. In general, the reduction of selenite ions occurs at a considerably faster pace than that of the selenate ions. The reduction of selenate may proceed in a stepwise fashion by first being reduced to selenite ions and then the selenite ions being reduced to elemental selenium. The Gibbs free energy of the selenate reduction reaction to magnetite has been calculated to be $-83.2$ kcal/mole.

Preferably, the selenium ions are selenite ions and selenate ions. Aso, the ferrous ions are suitably provided in the form of ferrous hydroxide and the ferrous ions are oxidized to magnetic ferric oxides after the contacting step. Typically, when the magnetic ferric oxides are formed they engulf the elemental selenium produced by the reaction.

Preferably, the contacting step is conducted at a pH of about 8 to 10, and more preferably, at a pH of about 9.

Also preferably, the ferrous ions and the selenium ions are contacted in a proportion of at least about nine molar equivalent of ferrous ions per molar equivalent of selenium ions. More preferably, the ferrous ions are present in a molar equivalent amount in far excess of the molar equivalent amount of the selenium ions.

In another aspect of this invention, the ferrous hydroxide is generated in the aqueous solution, for example ground water, in situ. Typically, the ferrous hydroxide may be generated by providing a ferrous salt and an alkali metal hydroxide or ammonium hydroxide to the solution. Suitable ferrous salts are ferrous chloride or ferrous sulfate. However, other ferrous salts may also be utilized. A suitable alkali metal hydroxide is sodium hydroxide, but other alkali metal hydroxides or ammonium hydroxide may also be utilized.

A preferred temperature for conducting the contacting step is about 10 to 35 degrees C., preferably about 17 to 30 degrees C. The rate of reaction is expected to increase with higher temperature.

The method of the invention may further comprise magnetically removing the ferric oxides containing the elemental selenium.

In another aspect of the invention the ferrous hydroxide may be generated by adding fine iron powder such as carbonyl iron to the aqueous solution at a pH of about 8 to 10. Typically, this process can be applied to aqueous solutions found in ground water, e.g., ponds.

In general, the following conclusions apply to the present method. Selenate ions and selenite ions in the aqueous phase can be reduced to elemental selenium with ferrous hydroxide. Sulfate ion is not reduced with $Fe(OH)_2$. During the oxidation of $Fe(OH)_2$, magnetite is an intermediate which eventually oxidizes to maghemite and other ferric oxides. The $Se^O$ which is produced remains in the iron oxide and may be recovered therefrom by dissolving the precipitate in acid. As set forth above, the rate of reduction for selenite to $Se^O$ with $Fe(OH)_2$ is considerably greater than for selenate, and the reaction for selenate reduction is reasonably fast for convenient commercial use. Fine iron powder can be used as a source of ferrous hydroxide since this compound can result from the oxidation of the iron metal.

The selective removal of selenium ions from water supplies can be achieved with a bed of ferrous hydroxide. Since the preferred pH of the reaction is alkaline, almost no pH adjustment must be made to the influent water since water containing selenate ions tends to be slightly alkaline. The product of the ferrous oxidation by selenate ions is a strongly magnetic iron oxide. And as indicated above, these oxides can be separated from the aqueous solution by applying a strong magnetic field. Moreover, the elemental selenium may be separated from the iron oxides by adding a strong acid thereto.

Fine iron powder such as carbonyl iron may be added to selenate and selenite contaminated water, e.g., a pond, by spraying the pond with such compound and thus purifying the water of selenium by "fixing" the selenium in the resulting iron oxide waste.

EXAMPLES

Two liters of filtered (0.45 micron) San Luis Drain water was added to a 4-liter container. Nine grams of ferrous hydroxide had been added beforehand to the container. The ferrous hydroxide was made by adding the necessary amounts of ferrous sulfate and sodium hydroxide according to the following equation:

$$FeSO_4 + 2\ NaOH \rightarrow Fe(OH)_2 + Na_2SO_4.$$

The drainage water was adjusted to 1000 micrograms/L selenium by adding sodium selenate before contacting with the ferrous hydroxide. The reason for adding additional selenate was to be sure the process was working on the selenate species, since the natural selenate in the water may have changed to another selenium form on standing (a year old drainage sample). A sample was obtained by opening a valve on the container and pouring the slurry into a syringe where the samples were again filtered (0.45 micron) into a digestion tube for a total selenium analysis. There was no pH adjustment or stirring of the slurry. Approximately 94% of the selenium from the water was reduced in 2 hours. This data shows that the reaction proceeds in a "reasonable time period" and does not provide information on how much ferrous hydroxide is needed or on what might be an effluent concentration from such a process.

One gallon of agricultural drainage water sampled at Check 2 from the San Luis Drain was sent priority mail from Sacramento on Dec. 1, 1986, and received in the U.S. Bureau of Reclamation Denver laboratory the next day. Five subsamples of 400 ml each, were added to their respective 500 ml flasks, labeled 1A to 5A. Into each flask was added approximately 2 grams of ferrous hydroxide.

The flasks were stoppered and placed on a tumbler, at a low speed, overnight. The next day, approximately 14 hours later, the samples were taken off the mixer and the precipitate allowed to settle. Next, about 250 ml each, were filtered through a 0.45 micron paper and added to bottles marked 1 B to 5B. "A" represented "after" or process effluent while "B" represented "before" or process influent. All 10 bottles were then acidified with 0.5 ml of nitric acid.

These samples were sent as "unknowns" to the U. S. Bureau of Reclamation Sacramento laboratory for total selenium analysis. The following results were obtained:

| Sample Identification | Selenium (micrograms/L) |
|---|---|
| 1A | <1 |
| 1B | 90 |
| 2A | <1 |
| 2B | 85 |
| 3A | <1 |
| 3B | 80 |
| 4A | <1 |
| 4B | 81 |
| 5A | <1 |
| 5B | 79 |

This data clearly shows that on a natural water known to contain primarily selenate-selenium and high concentrations of sulfate, the selenium is removed from the water. The remaining selenium concentration is extremely low and considered a safe concentration in even drinking water. The Environmental Protection Agency recommends total selenium in drinking water not to exceed 10 micrograms/L. This data does not show the necessary quantities of ferrous hydroxide needed for the process or the time needed for the reduction.

Selenite vs. Selenate

When an equivalent molar amount of sodium selenite instead of sodium selenate is used, maintaining the pH of the reaction at 9, the reaction proceeds faster than the buret could deliver acid to the system. That is, less than ten minutes compared to almost two hours with selenate. XRD of the resulting oxide confirms the appearance of magnetite. Elemental selenium remains in the beaker after dissolving the iron oxide with acid.

Reaction rate and pH

The relationship between the reaction rate and pH is tested. The rate is faster at a pH of 9.8 than at a pH of 7.8 and still faster at a pH of 8.8 than at a pH of 9.8 for the reduction of selenate ions. This data is derived with an autotitrator, maintained at the pH required, with the beaker covered as much as possible to exclude air.

The preceding examples are set forth to illustrate specific embodiments of the present invention and are not intended to limit the scope of the methods of the present invention. For example, owing to the similar chemistries of selenium, tellurium and polonium (all three are in the same group, VIa, in the Periodic Table), the methods of the invention employing ferrous hydroxide may be used to decontaminate waters containing these ions. Additional embodiments and advantages within the scope of the claimed invention will be apparent to one of ordinary skill in the art.

What is claimed is:

1. A method of selectively removing selenium ions from an aqueous solution, wherein said selenium ions are selected from the group consisting of selenite ions and selenate ions comprising contacting said solution at a pH of about 8 to 10 with an amount of ferrous ions effective to reduce said selenium ions to elemental selenium.

2. The method of claim 1, wherein
said ferrous ions are provided in the form of ferrous hydroxide and said ferrous ions are oxidized to magnetic ferric oxides after the contacting step.

3. The method of claim 2, wherein
said magnetic ferric oxides contain said elemental selenium.

4. The method of claim 3, further comprising
magnetically removing said ferric oxides containing said elemental selenium.

5. The method of claim 4, further comprising
separating said ferric oxides from said elemental selenium by adding a strong acid thereto.

6. The method of claim 2, wherein
said ferrous hydroxide is generated in situ.

7. The method of claim 6, wherein
said ferrous hydroxide is generated by providing a ferrous salt and an alkali metal hydroxide to said solution.

8. The method of claim 2, wherein
said ferrous hydroxide is generated by adding carbonyl iron to the aqueous solution at a pH of about 8 to 10.

9. The method of claim 8, wherein
the aqueous solution is ground water.

10. The method of claim 1, wherein
the pH is about 9.

11. The method of claim 1, wherein
said ferrous ions and said selenium ions are contacted in a proportion of at least about nine molar equivalent of ferrous ions per molar equivalent of selenium ions.

12. The method of claim 7, wherein
said ferrous ions are present in a molar equivalent amount in excess of the molar equivalent amount of the selenium ions.

13. The method of claim 1, wherein
said contacting step is conducted at a temperature of about 10 to 35 degrees C.

14. The method of claim 13, wherein
said temperature is about 17 to 30 degrees C.

* * * * *